United States Patent [19]

Smith

[11] 4,411,409
[45] Oct. 25, 1983

[54] TUBE PULLING AND LUBRICATING SYSTEM

[76] Inventor: Jackson A. Smith, Box 1058, Aldergrove, B.C., Canada, V0X 1A0

[21] Appl. No.: 190,015

[22] Filed: Sep. 23, 1980

[51] Int. Cl.³ .......................................... E21C 29/16
[52] U.S. Cl. ............................ 254/134.3 FT; 29/234
[58] Field of Search ................ 29/234; 254/134.3 FT, 254/134.3 R

[56] References Cited

U.S. PATENT DOCUMENTS 4,028,773  6/1977  Morgan.
4,078,767  3/1978  Battaglia .................... 254/134.3 FT
4,101,114  7/1978  Martin et al. .............. 254/134.3 FT
4,170,673  6/1979  Conti.

FOREIGN PATENT DOCUMENTS 1030060  3/1979  Canada.
1040060  7/1979  Canada.

Primary Examiner—Leon Gilden
Attorney, Agent, or Firm—Cushman, Darby & Cushman

[57] ABSTRACT

Apparatus and a method is disclosed for inserting a plurality of PVC liner tubes in a concrete duct. The liner tubes subsequently receive fibre optic cables which can be inserted into each PVC duct at any time after they are installed. The invention provides a liner to encase and separate each fibre optic cable from one another inside the concrete duct. Apparatus is also disclosed for pulling power cable through such ductwork.

3 Claims, 5 Drawing Figures

TUBE PULLING AND LUBRICATING SYSTEM

FIELD OF THE INVENTION

This invention relates to a tube and cable pulling system for pulling tubes or conduits of small diameter inside larger diameter tubes. Specifically, the invention relates to a method and apparatus for inserting small size PVC tubing into a larger existing PVC conduit so that the small size PVC tubing can subsequently accommodate fibre optic cable, standard telephone cable or power cable.

BACKGROUND OF THE INVENTION

Underground conduits for power cables and communication cables are interconnected at certain distances by manholes for maintenance purposes. The construction of such manholes is very expensive and their present spacing is required to facilitate the insertion and withdrawal of cables in the underground conduits some of which are the beehive type.

The present invention provides a means for pulling or drawing in one or more cables or PVC tubes in one operation and which can also lubricate the larger conduit at the same time. Use of the present invention provides the possibility of longer cable pulls up to a distance of two miles and which can therefore add substantial distances of the spacing of manhole construction and eliminate some of the costly manufacture associated therewith. The longer conduit length employed with the present invention reduces splices and connections for fibre optic and power insulated or grease-filled, oil-filled cables or solid conductor cables as used in the telephone and electric power industry.

It is normally a difficult and time consuming operation to separate one fibre optic cable from another or to employ more than one cable in one size different diameter duct. The use of the present invention allows quick and inexpensive means for changing a cable of small diameter whether it be a power cable, transmission cable or fibre optic cable, from a group of adjacent cables.

SUMMARY OF THE INVENTION

The present invention utilizes one or more tubular pulling eyes each of which receives at least one power cable or empty cable tube and this pulling eye is then drawn through a conduit of larger diameter. After the draw is made the pulling eyes are cut off and, if the pulling eye has drawn through a plurality of small tubes, these smaller tubes can then be used to accommodate individual fibre optic or like cables. When placing empty PVC plastic pipe into a larger size PVC tubing, a wooden or plastic rod of circular design is placed in the end of each tube. A plurality of these tubes are then inserted in the end of the pulling eye and the tubular part of the pulling eye is subsequently circumferentially crimped in a plurality of spaced locations throughout the length of the tube, embedding the crimps down onto the round, filled ends of the tubes. This provides pulling tension up to thirty thousand pounds per square inch depending on the material used. Greater pressure can be achieved by increasing the number of crimps throughout the length of the pulling eye. One or more reels are then placed on a truck or trailer, each single plastic tube or cable is then pulled over the top of each reel to start entry into the manhole in the underground conduit system. As an example, a four inch diameter plastic duct presently in place in a beehive configuration may accommodate four independent plastic conduits of a smaller diameter to be pulled into the four inch larger diameter duct. A plurality of pulling eyes connected to smaller PVC or cable are set back from each other approximately one foot to decrease the overall diameter at the head end when entering the larger duct. This bridle arrangement is passed through a special lubrication to lubricate the smaller diameter tubes and the larger duct or cable while it is entering the large ducting tube. When lubricant is being used, a lubricating swivel having a working load of four thousand to sixty thousand pounds would be attached to the cable pulling bridle to eliminate twisting from a main pulling winch line which is mounted on a truck unit. The swivel has a molded rubber disc of circular design and is grooved to a depth of approximately one eighth inch on the outside circumference for allowing the lubricant to pass by. After two or more plastic tubes have been placed into one larger tube, a fibre optic cable can be installed into the separated tubes without causing any damage to the delicate fibre optic cable.

According to one aspect of the present invention, an apparatus for drawing a plurality of resilient tubes through a single, larger tube comprises a swivel lead which is connected to a pulling eye tube and a plurality of resilient tubes are secured within the pulling eye tube. Each tube of the plurality thereof has filling means therein to resist collapsing, the tubular portion of the pulling eye being circumferentially crimped throughout its length around the tubes therein.

According to another aspect, the invention relates to a bridle apparatus for drawing a plurality of pulling eye tubes through ductwork, comprising a drawing link and a plurality of cables each interconnecting one of said plurality of pulling eyes to the link, all of said cables being of different length.

In a still further aspect, the invention relates to a method of pulling liner tubes through ductwork comprising the steps of (a) inserting filler plugs in the ends of a plurality of empty plastic liner tubes; (b) inserting said ends into a pulling eye; (c) crimping the tubular portion of the pulling eye around the tubes and fillers, and (d) drawing said pulling eye through the ductwork.

According to a still further aspect, the invention relates to a method of pulling power cable through ductwork comprising the steps of (a) grouping the ends of a plurality of power cables together; (b) placing a filler material intermediate adjacent cables on the outside of the grouping; (c) inserting the grouped cables and filler material into the end of a tubular pulling eye; (d) crimping the tubular portion of the pulling eye around the grouping and the filler material; and (e) pulling the pulling eye and cable ends through the ductwork.

BRIEF DESCRIPTION OF THE DRAWINGS

The invention is illustrated by way of example in the accompanying drawings in which.

Figure 1:
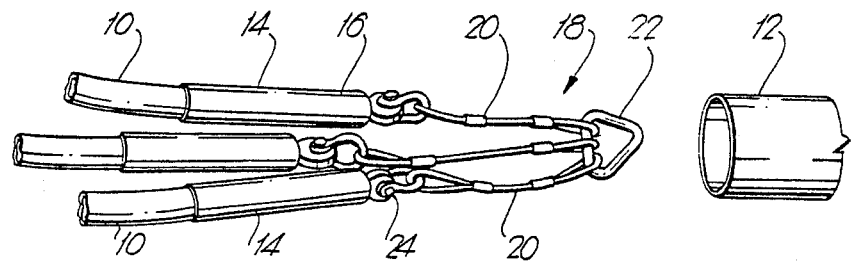
FIG. 1 illustrates a bridle connection for pulling a plurality of tubes through a larger tube.

One method of pulling a plurality of tubes or cables through a larger duct is shown in FIG. 1 in which a plurality of small diameter tubes or power cables 10 are to be drawn into a large diameter duct 12. Each cable or tube 10 is placed within the tubular portion 14 of a pulling eye 16 and the tubular portion 14 is either crimped throughout its length (such as in FIG. 3) to engage the cable or tube 10 or is adhesively sealed thereto. A bridle apparatus indicated generally at 18 is used to connect the plurality of pulling eyes 16 to a pulling cable, not illustrated. The bridle consists of a cable 20 connecting each pulling eye 16 to a link 22, at one end, and at the other end to a swivel joint 24 on the pulling eye. The use of cables 20 of different lengths, reduces the overall diameter of the head end of the pulling eyes so that, as they reach the interior of the tube 12, they will not become entangled.

Figure 2:
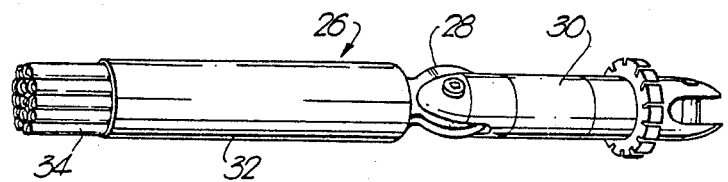
FIG. 2 is a perspective view of another embodiment of the pulling device.
Figure 3:
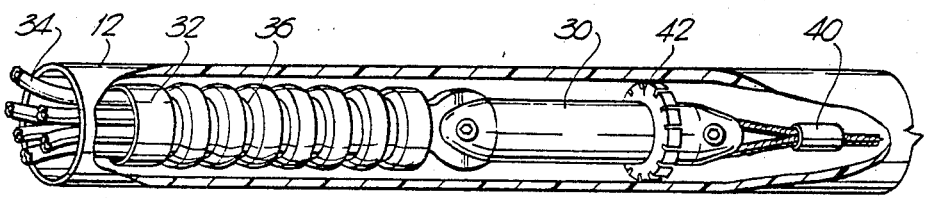
FIG. 3 is a perspective view, partly cut away, of a large conduit illustrating the method of pulling the smaller conduits therethrough.

Referring to FIGS. 2 and 3 which illustrate the preferred embodiment of the invention, a pulling eye 26 has an eye 28 at one end which is connected to a swivel 30 which in turn is connected to suitable means for drawing the swivel and the eye 26 through underground ductwork. The eye 26 includes an elongated tubular body 32 into which is placed a plurality of small diameter tubes 34 each of which subsequently may contain a separate power, communication cable or fibre optic cable. Before the tubes 34 are placed inside the tubular body 32 of the eye 26, they are provided with a suitable filling material such as a wooden dowel or the like. The tubular body 32 is then crimped at several locations 36 as shown in FIG. 3 to compress the tube 32 around the small inner tubes 34. The swivel 30 is then connected to a cable 40 and with the aid of lubricant, not shown, spread by the grooved disc 42 mounted on the swivel 30, the plurality of smaller tubes 34 is drawn into the large tube 12.

Figure 4:
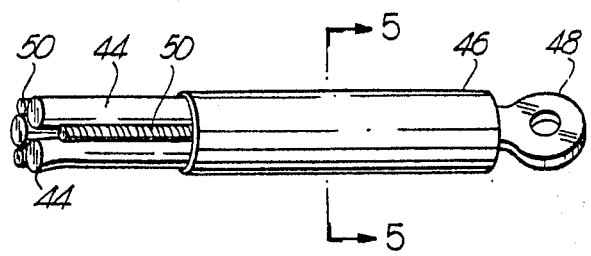
FIG. 4 is a further perspective view of a pulling eye in which a plurality of power cables are inserted.
Figure 5:
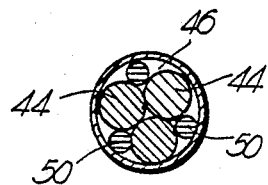
FIG. 5 is a cross section taken along the line 5—5 of FIG. 4.

The invention also provides for drawing solid core power cable into larger duct and as shown in FIG. 4, a plurality of individual power cables 44 are positioned within the tubular body 46 of a pulling eye 48. A suitable filler 50 is then placed between each adjacent cable in the group and on the outside diameter thereof as shown in FIG. 5 so as to fill as much as possible the interior of the tubular body of the pulling eye. This filler material can be scraps of smaller diameter power cable, pieces of rope or any suitable material. The body 46 of the pulling eye is then crimped as shown in FIG. 3, to securely hold the grouping of power cables within the pulling eye.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

I claim:

1. Apparatus for drawing a plurality of empty conduits through a single larger tube comprising a single elongated pulling tube having an open end and a closed end with a pulling eye on the exterior of the closed end for connecting the pulling tube to a swivel lead; filler means located in the ends of the empty conduits and being of a length commensurate with that of the pulling tube; said conduits with said filler means being inserted into said pulling tube and a plurality of circumferential crimps spaced along the length of said pulling tube whereby drawing pull applied to said pulling eye is transmitted to the conduits with the filler means.

2. Apparatus according to claim 1 wherein said filler means are pieces of dowel.

3. Apparatus for drawing a plurality of power cables through a single larger tube comprising a single pulling eye tube adapted for connection to a swivel lead, said power cables being grouped together and inserted in said single pulling eye tube; and a plurality of small diameter filler pieces combined in parallel with said power cables and located intermediate adjacent cables in the single pulling eye tube; and a plurality of spaced circumferential crimps applied throughout the length of said single pulling eye tube.

* * * * *